United States Patent
Ambuehl et al.

(10) Patent No.: US 7,565,583 B2
(45) Date of Patent: Jul. 21, 2009

(54) MULTILINK RECEIVER FOR MULTIPLE CORDLESS APPLICATIONS

(75) Inventors: Rolf Ambuehl, Lausanne (CH); Olivier F. Bodenmann, Echallens (CH); Pierre H. Chenes, Eclepens (CH); Philippe Junod, Romanel-sur-Morges (CH)

(73) Assignee: Logitech Europe S.A. (CH)

( * ) Notice: Subject to any disclaimer, the term of this patent is extended or adjusted under 35 U.S.C. 154(b) by 413 days.

(21) Appl. No.: 11/385,229

(22) Filed: Mar. 20, 2006

(65) Prior Publication Data
US 2006/0214818 A1 Sep. 28, 2006

Related U.S. Application Data

(62) Division of application No. 09/653,118, filed on Aug. 31, 2000, now Pat. No. 7,015,833.

(51) Int. Cl.
G06F 11/00 (2006.01)
G08C 17/00 (2006.01)

(52) U.S. Cl. .......................... 714/701; 341/20
(58) Field of Classification Search ................. 714/700, 714/701
See application file for complete search history.

(56) References Cited

U.S. PATENT DOCUMENTS

| | | | | |
|---|---|---|---|---|
| 4,864,158 A * | 9/1989 | Koelle et al. | ................... | 327/31 |
| 5,048,064 A * | 9/1991 | Rutherford | ................... | 377/20 |
| 5,297,149 A * | 3/1994 | Kazato | ................... | 714/24 |
| 5,305,449 A | 4/1994 | Ulenas | | |
| 5,436,853 A * | 7/1995 | Shimohara | ................... | 702/79 |
| 5,436,908 A * | 7/1995 | Fluker et al. | ................... | 714/700 |
| 5,479,648 A * | 12/1995 | Barbera et al. | ................... | 713/322 |
| 5,605,505 A | 2/1997 | Han | | |
| 5,703,409 A * | 12/1997 | Fukumitsu et al. | ................... | 714/704 |
| 5,793,359 A | 8/1998 | Ushikubo | | |
| 5,838,304 A | 11/1998 | Hall | | |
| 5,854,621 A | 12/1998 | Junod et al. | | |
| 5,881,366 A | 3/1999 | Bodenmann et al. | | |

(Continued)

FOREIGN PATENT DOCUMENTS

CN 88220901 12/1999

(Continued)

OTHER PUBLICATIONS

Chock, Ray; Petrilla, John; Crawford; Dick; et al. ; "IrDA Control Specification (Formerly IrBus), IrDA CIR (Control IR) Standard—Final Specifciaction" Final Revision, Jun. 10, 1998.

(Continued)

*Primary Examiner*—James C Kerveros
(74) *Attorney, Agent, or Firm*—Fenwick & West LLP

(57) ABSTRACT

One embodiment of the present invention provides a receiver for processing communication information included in transmissions received from a number of cordless devices. Another embodiment of the present invention provides a method for processing communication information included in transmissions received from a number of cordless devices. Another embodiment of the present invention provides a method for communicating status information from a cordless device to a corresponding driver running on a host system. Another embodiment of the present invention provides a method for processing digital information included in a transmission from a composite cordless device.

12 Claims, 7 Drawing Sheets

U.S. PATENT DOCUMENTS

| | | | |
|---|---|---|---|
| 5,890,015 A | 3/1999 | Garney et al. | |
| 5,896,534 A | 4/1999 | Pearce et al. | |
| 5,920,734 A | 7/1999 | Holmdahl | |
| 5,999,996 A | 12/1999 | Dunn | |
| 6,018,340 A | 1/2000 | Butler et al. | |
| 6,067,589 A | 5/2000 | Mamata | |
| 6,069,615 A | 5/2000 | Abraham et al. | |
| 6,070,204 A | 5/2000 | Poisner | |
| 6,158,030 A * | 12/2000 | Reichle et al. | 714/724 |
| 6,609,077 B1 * | 8/2003 | Brown et al. | 702/117 |

FOREIGN PATENT DOCUMENTS

| | | |
|---|---|---|
| DE | 29922853 U1 | 4/2000 |
| WO | WO 91/07826 | 5/1991 |
| WO | WO 98/56131 | 12/1998 |

OTHER PUBLICATIONS

Green, Gary; "Questions from the Community," Incisor, Oct. 1999.

PCT Search Report, International Application No. PCT/EP01/09907, May 2, 2002, 3 pages.

Sharp [publisher], "LZ85202 IrDA Control Host Controller with USB interface" Sharp, User's Guide, Ver 1.1, 1999.

* cited by examiner

MULTILINK RECEIVER FOR MULTIPLE CORDLESS APPLICATIONS

RELATED APPLICATIONS

This application is a divisional of U.S. Pat. No. 7,015,833, application Ser. No. 09/653,118, filed Aug. 31, 2000 by Rolf Ambuehl, Olivier F. Bodenmann, Pierre H. Chênes, and Philippe Junod, entitled "Multilink Receiver for Multiple Cordless Applications", the contents of which is herein incorporated by reference.

FIELD OF THE INVENTION

The invention relates to wireless communications, and more particularly, to a multilink receiver for multiple cordless applications.

DESCRIPTION OF THE RELATED ART

A conventional cordless desktop typically includes a cordless keyboard and a cordless mouse. Generally, there is a single receiver for receiving the transmission of both these devices. The frequency band of operation can vary from low (e.g., 27 MHz to 28 MHz) to high (e.g., 2.4 GHz to 2.5 GHz). Within the frequency band of operation, wireless communications are transmitted on one of two radio frequency (RF) links. An RF link is essentially a communication channel or specific frequency upon which cordless device information is carried. For example, one RF link at 27.145 MHz communicatively couples the cordless keyboard to the receiver, and the other RF link at 27.045 communicatively couples the cordless mouse to the receiver. Each RF link can process a certain number of instructions per second. One benefit of such a conventional system is that there are no physical cords connecting the mouse or keyboard to the receiver. Thus, desk clutter is reduced.

However, the receiver still requires a physical connection to the host computer system. More specifically, the receiver must be connected to a separate input port for each device. As such, two cables are required to physically connect the receiver to the computer. For example, the receiver must connect to a PS/2 or serial port of the host computer for the cordless mouse communications. Additionally, the receiver must connect to a PS/2 for the cordless keyboard communications. This is because each cordless device must be separately identified by the host computer, and neither a PS/2 port nor a serial port is able to process multiple device identities without the help of a dedicated driver.

Universal serial bus (USB) technology, on the other hand, provides a single port that can process multiple device identities. Generally, USB technology provides a plug-and-play interface between a host computer and peripheral wired devices such as a mouse or keyboard. However, not all computers are fully USB compatible thereby resulting in a number of functional problems. For example, several modes of computer operation exist where there is limited, or non-existent operating system functionality (excluding DOS functionality—a disk operating system). Likewise, there are several modes of computer operation where the active drivers are limited (e.g., no drivers are actually running, or only the display driver and the PS/2 port drivers are running). For a USB device to function properly, however, a USB driver must be installed and running in order to decode and process data. In addition, an operating system must be running on the computer for this USB driver to function properly. Without an installed and running USB driver, the supported USB devices will not function.

Consider, for example, a computer running in the BIOS setup mode, DOS mode, Is "safe mode" or other alternative operating modes. There is limited operating system functionality when a computer is operating in such modes. In addition, no USB driver is running when a computer is operating in such modes. As a result, for instance, a USB keyboard will not allow a user to enter the basic input output system (BIOS) of a system (e.g., setup mode) if the BIOS is not USB aware or its USB support is not turned-on. Similarly, a USB device (e.g., keyboard and or mouse) may not allow the user to interact with a computer running in DOS mode. Likewise, a USB device may not allow a user to interact with a computer running in safe mode, a mode where only limited drivers (excluding a USB driver) are allowed to run. In such cases, a non-USB keyboard or mouse must be substituted so that the user can interact with the computer until it is in a fully operational mode.

One possible solution in dealing with the incompatibilities associated with USB technology is to use a Y-configuration cable to couple the receiver to the computer, where one side of the Y-configuration cable is coupled to a PS/2 port of the computer to maintain keyboard operation, while the other side of the Y-configuration cable is coupled to a USB port of the computer for a USB device. In this case, the keyboard is removed from the USB stack working so that it can function pursuant to PS/2 protocols and a PS/2 driver. Thus, in the event that the USB driver is lost, the user will still be able to interface with the host computer via the non-USB keyboard. However, this solution requires more than one plug at the end of the cable (the Y-configuration cable, by definition, splits into two cables each having its own plug) for coupling the receiver to the computer. Moreover, such a solution requires the use of a non-USB data port.

What is needed, therefore, is a receiver that can receive transmissions from multiple devices, and report each device transmission to the host system via a cable coupled to a data port. This receiver should provide reliable communications when the host system is running in a mode where driver support is limited or non-existent.

BRIEF SUMMARY OF THE INVENTION

One embodiment of the present invention provides a receiver for processing communication information included in a transmission received from a cordless device, the receiver including a processing environment having an input that receives the communication information, where the processing environment further includes an input capture mechanism coupled to the input for collecting input capture data associated with the communication information, and a central processing unit having access to the input capture mechanism, the central processing unit for decoding the communication information based on the input capture data, and for formatting data included in the communication information. This embodiment can also include a data report engine operatively coupled to the central processing unit, the data report engine for communicating the data to a host system having no active driver corresponding to the cordless device.

Another embodiment of the present invention provides a method for processing communication information included in a transmission received from a cordless device by collecting input capture data included in the communication information, decoding the communication information based on the input capture data, formatting data included in the communication information, and communicating the data to a host system having no active driver corresponding to the cordless device.

Another embodiment of the present invention provides a method for communicating status information from a cordless device to a corresponding driver running on a host system by receiving a standard data report that indicates that status reporting is enabled and status data is available to be collected for the cordless device, and retrieving the status data.

Another embodiment of the present invention provides a method for processing digital information included in a transmission from a composite cordless device by collecting input capture data included in the digital information, determining whether data included in the digital information is a first data type or a second data type based on the input capture data, and communicating the first type of data to its correct destination, and communicating the second type of data to its correct destination.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
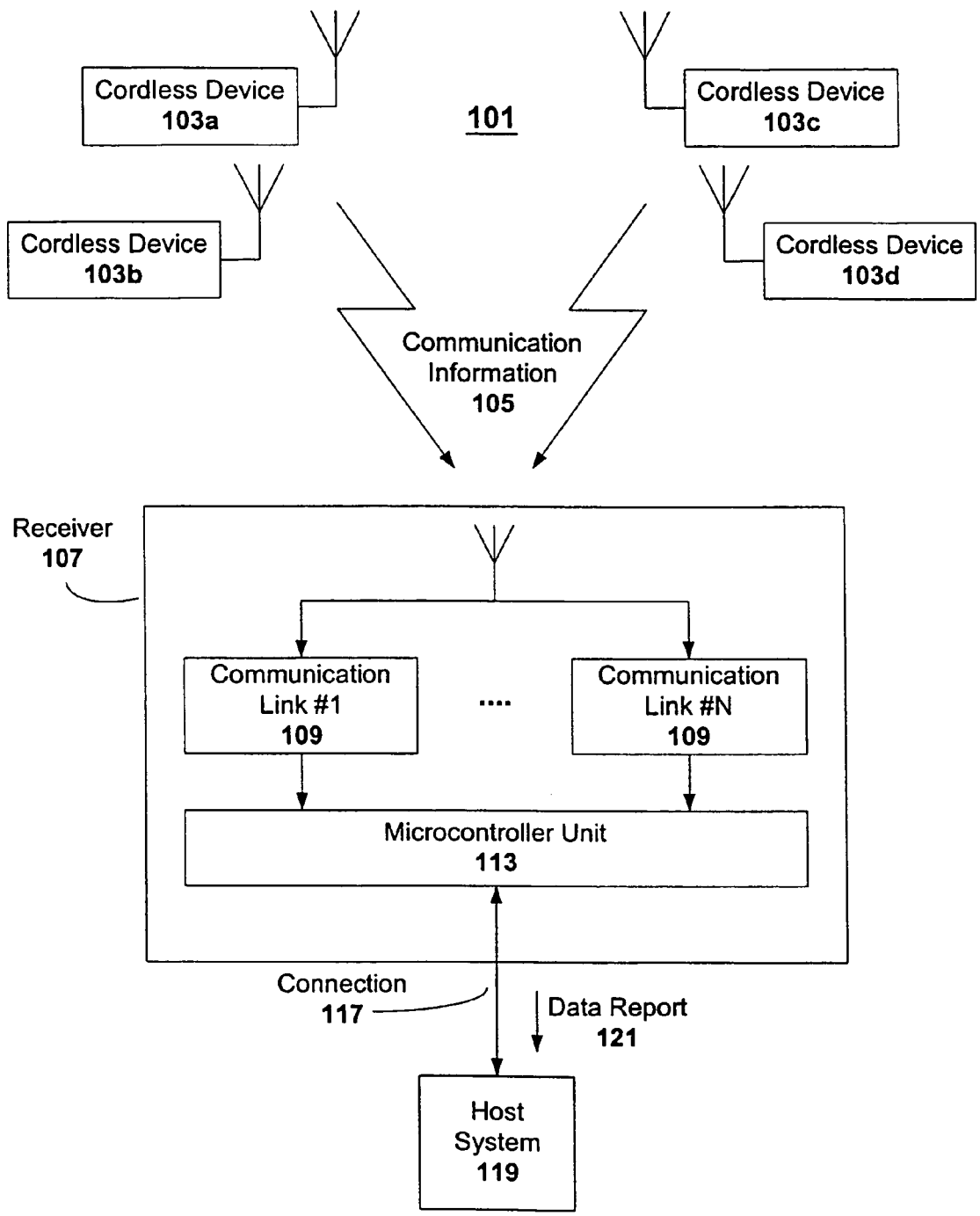
FIG. 1 is a block diagram illustrating a cordless desktop system in accordance with one embodiment of the present invention.

FIG. 1 is a block diagram illustrating a cordless desktop system in accordance with one embodiment of the present invention. The system is generally referred to as system 101. System 101 includes a number of cordless devices 103 (e.g., 103a, 103b, 103c, and 103d). Each of these devices 103 is capable of generating and transmitting communication information 105 to receiver 107, which processes communication information 105 and reports it to host system 119. The embodiment of receiver 107 shown includes a number of communication links 109 (e.g., communication link #1 through communication link #N), and a microcontroller unit (MCU) 113. Receiver 107 is coupled to a data port (e.g., USB data port) of host 119 via a connection 117, and provides a data report 121 to host 119. Each of the components included in system 101 will now be discussed in more detail.

Each device 103 can be any one of a number of cordless devices capable of communicating with receiver 107. For example, a device 103 can be: a full keyboard (e.g., for normal computer use), a mini-keyboard (e.g., for Internet use), a keypad, a telephone, a scanner, a remote control, a set-top box, an audio player, a touchpad, a gamepad, a mouse, a trackball, a joystick, a personal digital assistant or a video player. In one embodiment, device 103a is a cordless keyboard, device 103b is a cordless mouse, device 103c is a cordless telephone, and device 103d is a cordless joystick. However, other devices and combinations of devices can also be used. Each of these devices can be associated with a communication link 109. Thus, in one embodiment, communication links 109a, 109b, 109c and 109d could correspond to cordless devices 103a (e.g., 2.4 GHz keyboard), 103b (e.g., 27 MHz mouse), 103c (e.g., 900 MHz telephone), and 103d (e.g., 2.4 GHz personal digital assistant), respectively.

Alternatively, one communication link 109 could be used to support more than one cordless device. For example, device 103a (e.g., 2.4 GHz full keyboard) and device 103c (e.g., 2.4 GHz mini-keyboard) could correspond to communication link 109a, and device 103b (e.g., 27 MHz mouse) and device 103d (e.g., 27 MHz gamepad) could correspond to communication link 109b. In such an embodiment, one cordless device 103 (e.g., full keyboard or mouse) could be actively communicating over the corresponding communication link 109 while the other cordless device (e.g., mini-keyboard or a gamepad) corresponding to the communication link would be dormant or unused. In another embodiment, a keyboard having an integrated function such as a trackball, touchpad or mouse, could send all data-types (e.g., keyboard key data or touchpad data or mouse data) over one communication link 109. Regardless of whether a communication link 109 is shared or not, the active cordless device 103 generates and transmits communication information 105, which is then filtered and demodulated by a physical layer associated with the corresponding communication link 109. The filtered and demodulated digital signal can then be delivered, for example, to an input of MCU 113 for additional processing.

In one embodiment, each communication link 109 can be coupled with a dedicated I/O of MCU 113. In such an embodiment, each I/O can be associated with a process that detects the receipt of a filtered and demodulated digital signal from the corresponding communication link 109, and then processes (e.g., decode and format) data included in that signal. In such an embodiment, each communication link 109 can be processed simultaneously or one at a time. Alternatively, each communication link 109 can be multiplexed to an I/O of MCU 113. In this embodiment, a process (e.g., running in MCU 113) associated with the I/O can determine what particular communication link 109 generated the filtered and demodulated digital signal, and then process the data accordingly. MCU 113 can include, for example, a microprocessor or central processing unit (CPU) that is capable of executing programming instructions to carry out such processes. MCU 113 may also include other support functions such as random access memory, read only memory, I/O ports, timers, buffers, and a data port interface and supporting resources (e.g., USB engine). Other equivalent processing environments suitable for running a real-time process can also be used in place of MCU 113 (e.g., a single board computer).

Generally, the filtered and demodulated digital signal from a communication link 109 includes a number of digital communication packet (sometimes referred to as frames). In general, these packets are derived from the communication information 105 during the filtering and demodulation process. The processing performed on these packets by receiver 107 can include decoding at various levels. For instance, at an edge-decoding level, the time between the two adjacent edges (e.g., rising and falling edges) of a pulse included in a packet can be measured. In such an embodiment, a timer included in MCU 113 can be read at the occurrence of each edge of the pulse thereby defining a pulse width. Based on the pulse width and the encoding scheme used in generating the communication signal (e.g., the encoding scheme implemented in the transmitter of the cordless device), a determination can then be made as to what that particular pulse represents (e.g., a "0", "1", "00", or "01" bit pattern, or a start or stop pattern indicating the start or stop of a transmission from a cordless device 103). Thus, each packet included in the filtered and demodulated digital signal can be reduced to a binary string of information that can be further and readily processed. The discussion with reference to FIG. 5 further details edge-level processing in accordance with one embodiment of the present invention.

At a bit-decoding level, the bit chunks (e.g., fields included in a packet of a digital signal) can be processed. Bit chunks include, for example, media access control (MAC) information such as the frame type field, data type field, and transmitting device identity or ID (e.g., short ID) field. Bit chunks might also include a data field, and a protect (e.g., CRC-cyclical redundancy check) field. The type of bit chunks that comprise a packet included in a digital signal can vary depending on factors such as the desired system performance system and processing power of MCU 113. Other information can be represented such as additional data fields, address or sub-address information relevant to the transmitting cordless device 103, and device profile information, whether it is a profile code or actual device characteristics (e.g., size, color, shape and number of buttons). Regardless of the packet structure, if it is determined that data included in the packet is valid (e.g., a correct CRC is identified), then a flag can be set to indicate that data (e.g., a full message) is ready to be processed. A detailed discussion regarding packet structure and the bit-level processing of same is described in U.S. Pat. No. 5,881,366, which is herein incorporated in its entirety by reference for all that it teaches.

At a data-decoding level, data ready to be processed (e.g., as indicated by the bit-decoding level) can then be interpreted and formatted, and then provided to a data report engine (e.g., a USB engine) for transfer to host 119. In one embodiment, the formatted data is stored into variables that are associated with a data structure that is associated with the corresponding transmitting cordless device 103. For example, the formatted data can be provided to a USB engine running in MCU 113, placed into USB buffers (e.g., endpoints or data structures) included in MCU 113, and then be transferred to host 119 at the next USB request. In such an embodiment, a data can be loaded into USB buffers, which are polled by host 119 on a periodic basis (e.g., each 8 milliseconds). If data is available in a USB buffer, then host 119 retrieves that data. Otherwise, host 119 can receive, for example, a "no data available" message (e.g., a not acknowledged NAK signal per the USB specification). Responsive to the completion of the data transfer from the USB buffer to host 119, a notification can be generated so that a new data report can be loaded into the USB buffer. Such a notification avoids the risk of overwriting a non-transferred data report. Those skilled in the art will recognize other polling and data request schemes, as well as other interrupt schemes that can be implemented in light of Is this disclosure. The discussion with reference to FIG. 6 further details data-level processing in accordance with one embodiment of the present invention.

The processing power of MCU 113 can vary depending, for example, on the type of microprocessor included in MCU 113, and the number of I/Os that are being supported. In one embodiment, MCU 113 has one I/O per communication link 109, and can further have the capability to process one million instructions per second (MIPS) per communication link 109. Other embodiments may have greater or lesser processing power depending on desired performance. Moreover, each I/O need not have the same processing power as the relationship between processing power and the number of I/Os is not necessarily linear. Consider an embodiment where MCU 113 receives the output signals of three communication links 109: (1) one for a wireless keyboard (e.g., at about 27.145 MHz), and (2) one for a wireless mouse (e.g., at about 27.045 MHz), and one for a wireless phone (e.g., at about 2.45 GHz). In such an embodiment, receiver 107 could include a MCU 113 having at least three available I/Os (one for each communication link 109) and have the capability to process at least one MIPS per link (with respect to the 27 MHz range links).

As previously discussed, MCU 113 can include a data report engine to process data requests from host 119. Alternatively, the data report engine can exist independently of MCU 113. The functionality of this data report engine can be implemented, for example, in software, hardware, firmware or any combination thereof. The output of the data report engine can be coupled by connection 117 to a data port included in host 119. In one embodiment, the data report engine is a USB engine. Other data report engines (e.g., a PS/2, a RS-232, or IEEE 1394) can also be used to transfer the decoded and formatted data to a corresponding port of host 119. Regardless of the data port technology implemented, the supported cordless devices 103 (e.g., mouse and or keyboard) can perform various functions declared in the data report engine independent of the drivers or the operating system running on host system 119. Thus, host 119 need not have an active driver that corresponds to such cordless devices in order to understand data reports from those devices.

Host system 119 may be a conventional computing machine such as a personal computer, a lap top computer, a Macintosh computer, a workstation, a function specific computer (e.g., a game console), or other processing environment. Alternatively, host 119 can be an electronic device such as a set-top box, a television with integrated set-top box functionality, a personal digital assistant, or any device that can receive a data report derived from communication information transmitted from a cordless device. Host system 119 may include a conventional operating system such as Microsoft Windows, MacOS, BeOS, PalmOS, OS/2, Linux, UNIX, a function specific operating system (e.g., a game console operating system) or other operating systems. Connection 117 can be implemented, for example, by a single end to end cable with a USB-type plug on the end that couples to a USB data port included in host 119. However, any cable configuration (including adapters) that can couple the output of MCU 113 to a data port of host 119 can be used.

Receiver 107 is shown as a receiving device only. However, receiver 107 can also have transmission functionality (e.g., a transceiver 107). In such an embodiment, receiver 107 could include a transmitter circuit for transmitting communication information to a cordless device 103. For example, a personal digital assistant could receive a down load of electronic mail from host 119 via transceiver 107. Likewise, a cordless device (e.g., a keyboard) could receive a signal from host 119 via transceiver 107 causing an LED indicator on the cordless device to illuminate (e.g., illuminated indicator might indicate that a strike price for a particular stock has been achieved and that a buy or sell order should be instigated). Similarly, a cordless device (e.g., a set-top box) could receive a signal from host 119 via a transceiver 107 causing the set-top box to access a particular web site via the Internet, or to record a certain television program. Thus, the term transceiver can be interchanged with the term receiver throughout this description. In addition, receiver 107 can be integrated into host system 119. For example, host 119 may include a conventional housing (e.g., a standing tower or laptop casing) where the housing includes typical items such as a hard drive, motherboard, and compact disk drive. In an integrated embodiment of the present invention, such a housing might also include receiver 107, or the functionality of receiver 107.

One skilled in the art will understand in light of this disclosure that a number of communication signals from diverse cordless devices can be received and processed by receiver 107. For example, a combination of communication signals from two RF cordless devices (e.g., a 27 MHz cordless device and a 900 MHz cordless device) and two microwave cordless devices (e.g., a 1.89 GHz cordless device and a 2.4 GHz cordless device) can be received and processed by receiver 107. In addition, a number of wireless communication protocols can be detected and implemented by receiver 107. For example, an RF protocol that can be detected and implemented by receiver 107 is described in U.S. Pat. No. 5,881,366 (already incorporated in its entirety by reference). Other example protocols that can be detected and implemented by receiver 107 might include the Bluetooth protocol of the Bluetooth Special Interest Group, the Shared Wireless Access Protocol (SWAP) of the HomeRF Working Group, the Digital Enhanced Cordless Telecommunications (DECT) protocol of the DECT Forum, and the IEEE 802.11 or 802.15 protocols of the Institute of Electrical and Electronic Engineers.

Figure 2:
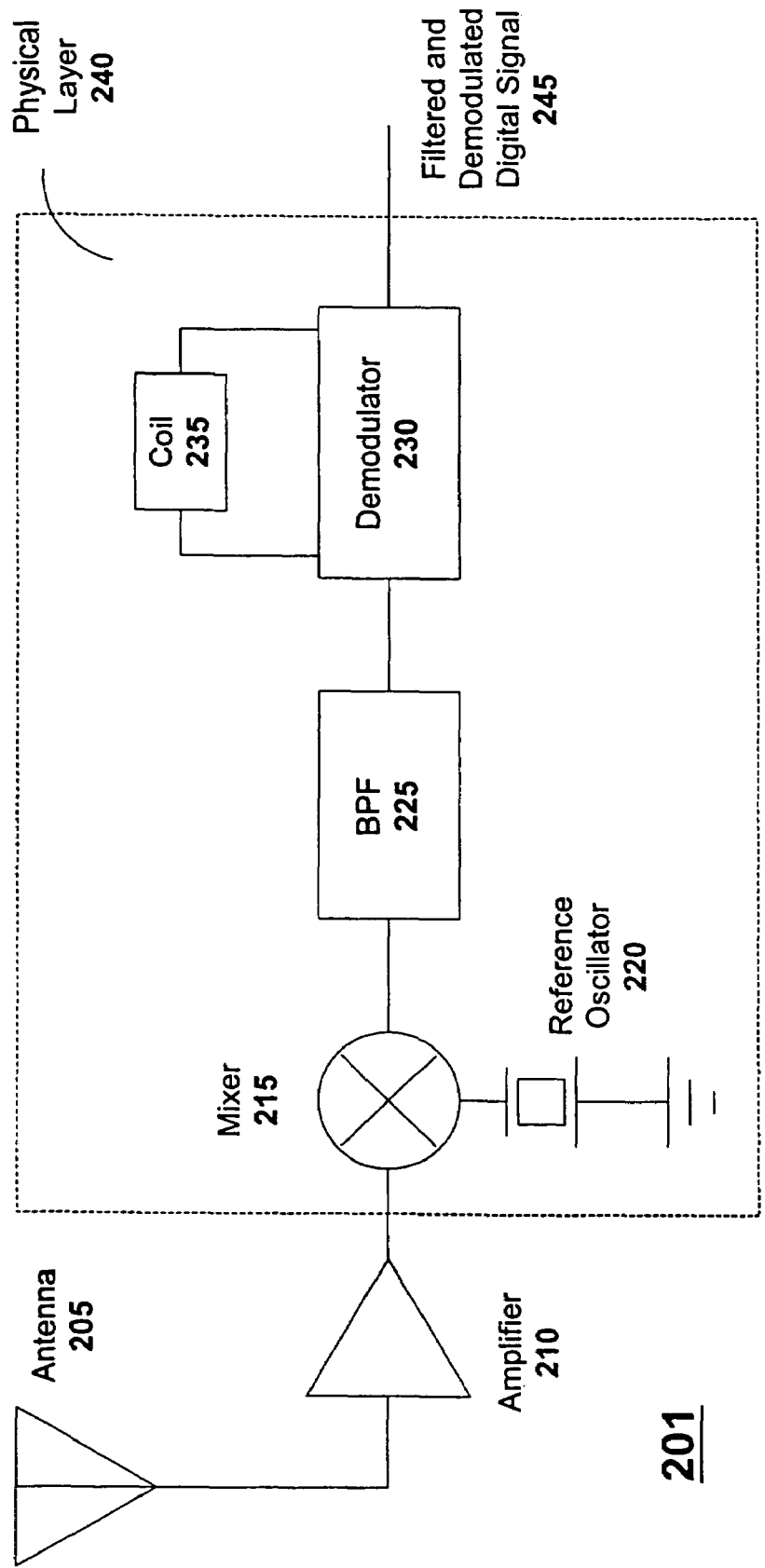
FIG. 2 is a block diagram illustrating a communication system for generating an output signal in accordance with one embodiment of the present invention.

FIG. 2 is a block diagram illustrating a communication link in accordance with one embodiment of the present invention. Communication link 201 includes an antenna 205, an amplifier 210 and a physical layer 240. Physical layer 240 is further comprised of a mixer 215, a reference oscillator 220, a band-pass filter 225, a demodulator 230 and a coil 235. Antenna 205 is coupled to amplifier 210, which is coupled to mixer 215. Mixer 215 is coupled to an output of amplifier 210, and is further coupled to an output from reference oscillator 220. An output of mixer 215 is coupled to an input of band-pass filter 225. An output of band-pass filter 225 is applied to an input of demodulator 230. Coil 235 is coupled to demodulator 230. Filtered and demodulated digital signal 245 is output from demodulator 230. Those skilled in the art will understand that communication link 201 also includes the intangible electronic channel formed by a carrier signal containing communication information that is received by antenna 205. This intangible electronic channel effectively couples the antenna of the transmitting device to the antenna of the receiving device. Thus, communication link 109 can include any both tangible and intangible components.

Antenna 205 receives the communication information (e.g., radiation from a cordless device), and converts that communication information to an equivalent electrical signal. That electrical signal is then applied to amplifier 210. Amplifier 210 amplifies the electrical signal to facilitate processing of the signal, and further provides impedance matching between antenna 205 and mixer 215. In an alternative embodiment, amplifier 210 is embedded with mixer 215 in a single component, and is implemented in a standard bipolar silicon technology. Alternatively, amplifier 210 can be a low-noise amplifier (LNA) so as to maintain a desired signal-to-noise ratio in the amplifier thereby improving the reliability and performance of the communication link. Those skilled in the art will recognize other benefits of reducing the noise contribution of amplifier 210.

The output of amplifier 210 is then applied to mixer 215. Mixer 215 converts the frequency of the output of amplifier 210 to a lower frequency where signal processing (e.g., filtering) is easier to implement. The lower frequency is defined by the difference between the frequency of the output signal of amplifier 210 and the frequency of the reference signal provided by reference oscillator 220. Mixer 215 also generates a series of higher frequencies (e.g., a frequency that is defined by the sum of the frequency of the output of amplifier 210 and the frequency provided by reference oscillator 220). The outputs of mixer 215 are then applied to a band-pass filter 225.

Band-pass filter 225 is provided to attenuate the output signals of mixer 215 that have a frequency that is outside the passband of the filter. In contrast, the useful frequency output of mixer 215 is within the passband, and therefore is passed through band-pass filter 225. Band-pass filter 225 can be implemented in active or passive components. Additionally, filter 225 may be implemented in various technologies well known in the art. For example, band-pass filters of an RF communication system can be ceramic filters or SAW (Surface Acoustic Waves) filters. Such filters achieve higher performance (e.g., narrow bandwidth) than, for example, inductor/capacitor based filters. Those skilled in the art will appreciate that the design of a filter depends upon the desired filter characteristics (e.g., roll-off rate, gain, ripple, power consumption and physical size). The usable frequency output of band-pass filter 225 is applied to a demodulator 230.

Demodulator 230 is provided for demodulating the modulated output of mixer 215 that was passed by band-pass filter 225. In one embodiment, the frequency of the output signal of band-pass filter 225 is converted into an analog voltage. This corresponds to the frequency demodulation required to recover audio voltage containing a transmitted message. Coil 235, also referred to as a quadrature coil, provides tunable inductance to facilitate the demodulation.

The functionality of the demodulator 230 and coil 235 can be implemented, for example, in software, hardware, firmware or any combination thereof. In one embodiment, demodulator 230 is implemented by a high performance processor or other processing environment that is capable of real-time processing of an analog communication signal (e.g., an analog-to-digital converter coupled to a digital signal processor). Other processing means, such as an application specific integrated circuit (ASIC) or gate array, can also be implemented to perform the function of demodulator 230. Regardless of how demodulator 230 is implemented, the resulting output is filtered and demodulated digital signal 245. Filtered and demodulated digital signal 245 can be, for example, a baseband signal. However, signal 245 need not be a baseband signal. For example, signal 245 can be a broadband signal, or any signal comprised of data packets that digitally represent the transmitted information.

In one embodiment, the signal received by antenna 205 is at a frequency of about 27 MHz. For example, a wireless keyboard that has a transmission frequency of about 27.145 MHz, or a wireless mouse might have a transmission frequency of about 27.045 MHz. Additionally, assume (for the sake of discussion purposes only) that the frequency of reference oscillator 220 is approximately 455 KHz less than the transmission frequency. Thus, in considering the wireless keyboard example, the frequency of the reference oscillator 220 is about 27.145 MHz-455 KHz. As such, the low frequency output of mixer 215 is therefore approximately (27.145 MHz-(27.145 MHz-455 KHz)), which is approximately 455 KHz. So the amplitude of the 27.145 MHz transmission signal is varied at a rate approximately equal to 455 KHz. This modulated signal passes through band-pass filter 225. Demodulator 230 then demodulates the modulated signal and outputs signal 245. The demodulation method described above is referred to as a single conversion frequency shift keying (FSK) demodulation. Other techniques can also be employed such as dual conversion FSK demodulation, amplitude shift keying (ASK) demodulation, zero intermediate frequency (IF) demodulation. The above discussion is provided to illustrate various embodiments of communication systems and to facilitate discussion. Those skilled in the art will recognize many other embodiments and variations of modulation techniques and communication systems in light of this disclosure.

Figure 3:
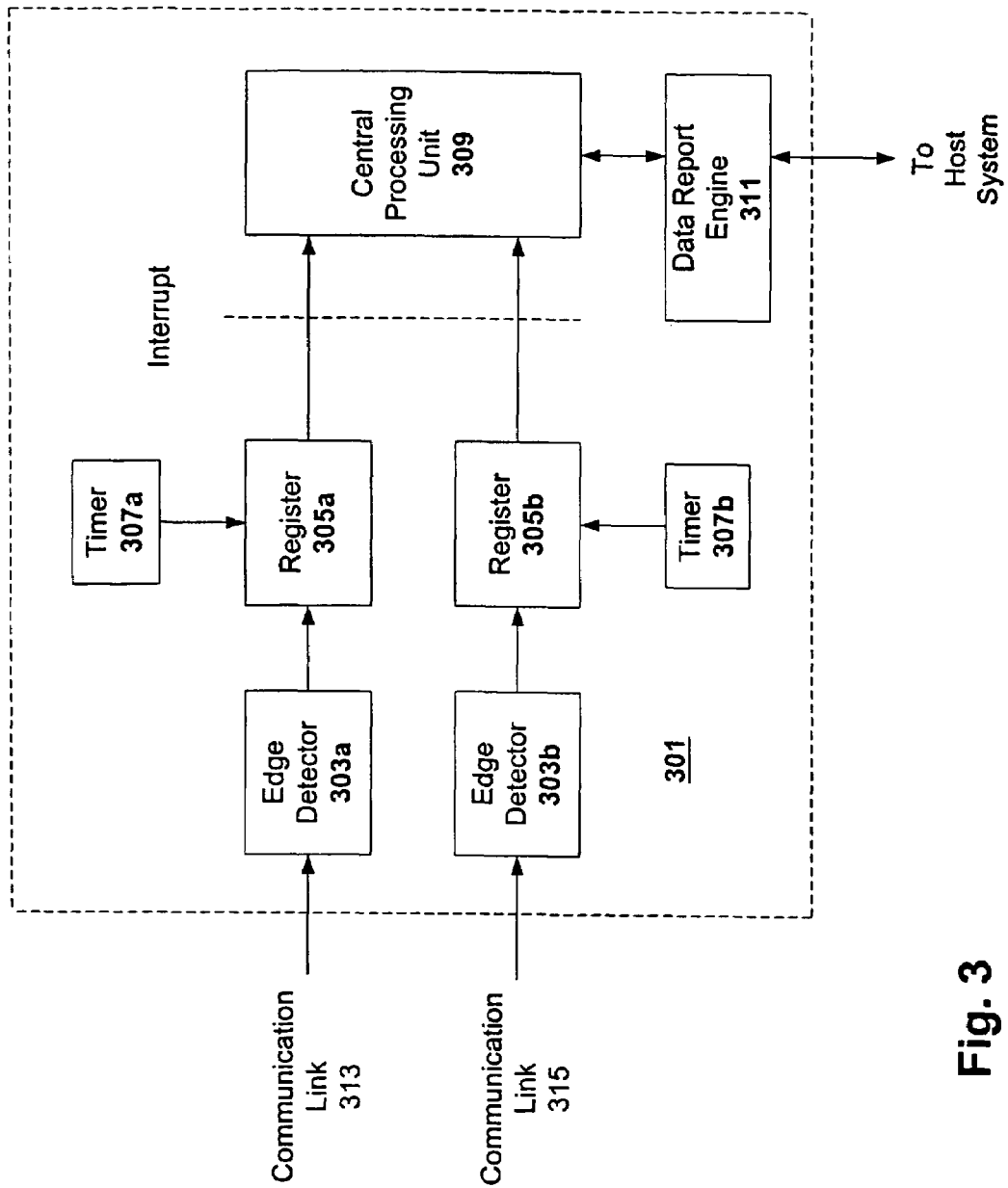
FIG. 3 is a block diagram illustrating a microcontroller for processing multiple communication links in accordance with one embodiment of the present invention.

FIG. 3 is a block diagram illustrating a microcontroller for processing multiple communication links in accordance with one embodiment of the present invention. In this embodiment, MCU 301 includes a number of edge detectors 303 (e.g., 303a and 303b), a number of registers 305 (e.g., 305a and 305b), a number of timers 307 (e.g., 307a and 307b), a central processing unit (CPU) 309 and a data report engine 311. A communication link 313 is coupled to edge detector 303a via a first I/O of MCU 301, and a communication link 315 is coupled to edge detector 303b via a second I/O of MCU 301. An output of data report engine 311 is coupled to a host system.

Each of the components shown in MCU 301 can be implemented, for example, in software, hardware, firmware or any combination thereof. Other components not shown in FIG. 3 may be included in MCU 301 as well, such as additional CPUs 309, random access memory (RAM), read only memory (ROM), buffers, non-volatile memory devices (e.g., electrically erasable programmable ROM, or flash memory), timers, logic units or other specific support functions. In addition, the functionality of the various components can be embedded in a CPU 309 that has sufficient processing power. For example, the functionality of edge detectors 303 can be included in the functionality of CPU 309. Similarly, registers 305 can be included in CPU 309. The architecture of MCU 301 can be implemented with independent components included on, for example, a card level design. Alternatively, the architecture of MCU 301 can be implemented on, for example, a single ASIC, or a set of ASICs. The functionality of MCU 301 will now be discussed in terms of the components shown in FIG. 3.

An edge detector 303 detects the state transitions (e.g., rising and falling edges) of the filtered and demodulated digital signal applied to an I/O of MCU 301. In one embodiment, a comparator or other state transition sensing circuit (e.g., a state transition detecting I/O of a high performance CPU or MCU) can be used to detect the edges of the incoming digital signal. The triggering threshold of edge each detector 303 can be set as desired. For example, the triggering threshold can be set to about 50% of a typical logical high value). Each time the triggering threshold is crossed, whether from a logical low to logical high or vice versa, the value of a corresponding timer 307 is read, and then stored in a register 305 for processing. As such, each state transition included in a packet of the digital signal is effectively time-stamped thereby providing an input capture mechanism.

Once two or more edges of a particular packet have been time-stamped or otherwise captured, then a width of a pulse defined by two adjacent edges can be determined (e.g., absolute value of $Time_{edge1}-Time_{edge2}$). This pulse width, which can be stored as well, is one characteristic that can then be used to determine the meaning of the pulse. The processing of the edge times can be performed contemporaneously with edge detection, or at a later time (e.g., once edge detection for a packet is complete). Whether edge detection and edge processing are performed contemporaneously is a function of, for example, the ability to perform parallel processing as well as processing speed of MCU 301. Once the meaning for each pulse of a packet is determined, other information included in the packet can be further processed (e.g., MCU 113 can perform bit-level and data-level decoding).

Other types of input capture data can be used to characterize a received digital signal as well. For example, voltage levels, rise and fall rates, frequency, and duty cycle can be examined in order to determine the meaning of the received communication signal. Those skilled in the art will understand that numerous communication signal characteristics can be exploited as input capture data in ascertaining the meaning of the communication signal's content. As such, various input capture mechanisms will be apparent in light of this disclosure depending on the communication signal characteristics being exploited.

In one embodiment, the occurrence of a state transition on the I/O of MCU 301 triggers an interrupt, which notifies the corresponding edge detector 303 to capture the digital signal at the I/O. Such an interrupt can further cause a routine (e.g., a set of instructions running in MCU 301) to be executed that reads the corresponding register 305 and writes the time data from that register 305 to a buffer (not shown). The size of the buffer can be limited, for example, to four edges. In general, the buffer size is selected so that no edge data is prematurely overwritten in the buffer. For instance, knowing that the edge occurrence rate of the encoded communication signal should not exceed a given rate based on the encoding technique (e.g., a Miller mean rate of 416 microseconds), and knowing that the given processing power of MCU 301 (e.g., one MIPS) allows the buffer to be emptied at about the same or faster rate, the buffer can be emptied (e.g., read) faster than it fills up. As such, a buffer full of noisy edges (e.g., caused by the decoding of a non-meaningful signal) can be emptied while the preamble (e.g., start pattern) of a new message is being received. Thus, the buffer will be ready to process the message (e.g., the bit patterns following a start pattern) when the preamble is over. The more powerful the processing capability of MCU 301, an edge detection interrupt may not be necessary as both edge detection and other functions can be performed contemporaneously.

In the embodiment of MCU 301 shown, communication link 313 might correspond to a cordless keyboard, while communication link 315 might correspond to a cordless mouse (note, however, that additional communication links, as well as other cordless-type devices, could also be used). In such an embodiment, communication link 313 is provided to a first dedicated I/O of MCU 301. The packets that comprise the digital signal associated with communication link 313 are received by edge detector 303a, and each edge (whether rising or falling) included in every packet is effectively time-stamped, where the value of timer 307a is read in response to edge detector 303a detecting the occurrence of an edge. Each timer 307a value is stored in register 305a. CPU 309 can then access register 305a, calculate pulse widths defined by times of adjacent edges, and determine the meaning of the information included in each packet of the digital signal from communication link 313.

Likewise, communication link 315 is provided to a second dedicated I/O of MCU 301. The packets that comprise the digital signal associated with communication link 315 are received by edge detector 303b, and each edge (whether rising or falling) included in every packet is effectively time-stamped, where the value of timer 307b is read in response to edge detector 303b detecting the occurrence of an edge. The timer 307b value is stored in register 305b. CPU 309 can then access register 305b, calculate pulse widths defined by times of adjacent edges, and determine the meaning of the information included in each packet of the digital signal from communication link 315. Each of the signals from the first communication link 313 and the second communication link 315 can be processed simultaneously. The edge detection can be given a higher priority than the actual processing of the edges by CPU 309 (e.g., via an interrupt scheme).

In one embodiment, data report engine 311 is a USB engine that provides an interface for a composite device (as defined in USB specification) composed of different sub-devices on the same communication link. For example, a composite device might be a keyboard having an integrated pointing device function such as a keyboard having a built-in mouse, touchpad, wheel and or trackball. In such an embodiment, data from the sub-devices is transmitted over the same communication link (e.g., communication link 313). The identity of the sub-device that transmitted the particular data type is determined during the decoding process (e.g., edge-level, bit-level and data-level decoding). Essentially, each data type from a communication link that is coupling a composite device to the receiver is processed in the order it was received.

On the other hand, data streams from stand alone cordless devices (not a composite device) associated with different communication links (e.g., communication links 313 and 315) are processed by CPU 309 independent of one another. Regardless of which type of device (e.g., stand alone or composite) each communication link is associated, the resulting data reports are provided to the host system via data report engine 311. The different data types, however, included in each data report are routed to the correct destination by the basic support software associated with the host system (e.g., the BIOS or operating system, whether DOS or other, of the host system). Thus, there is no need for a dedicated driver (e.g., a USB driver) on the host system to ensure reliable communication between the cordless devices associated with communication links 313 and 315 and the host system. The functionality of data report engine 311 will be further explained in discussion with reference to FIG. 4.

Figure 4:
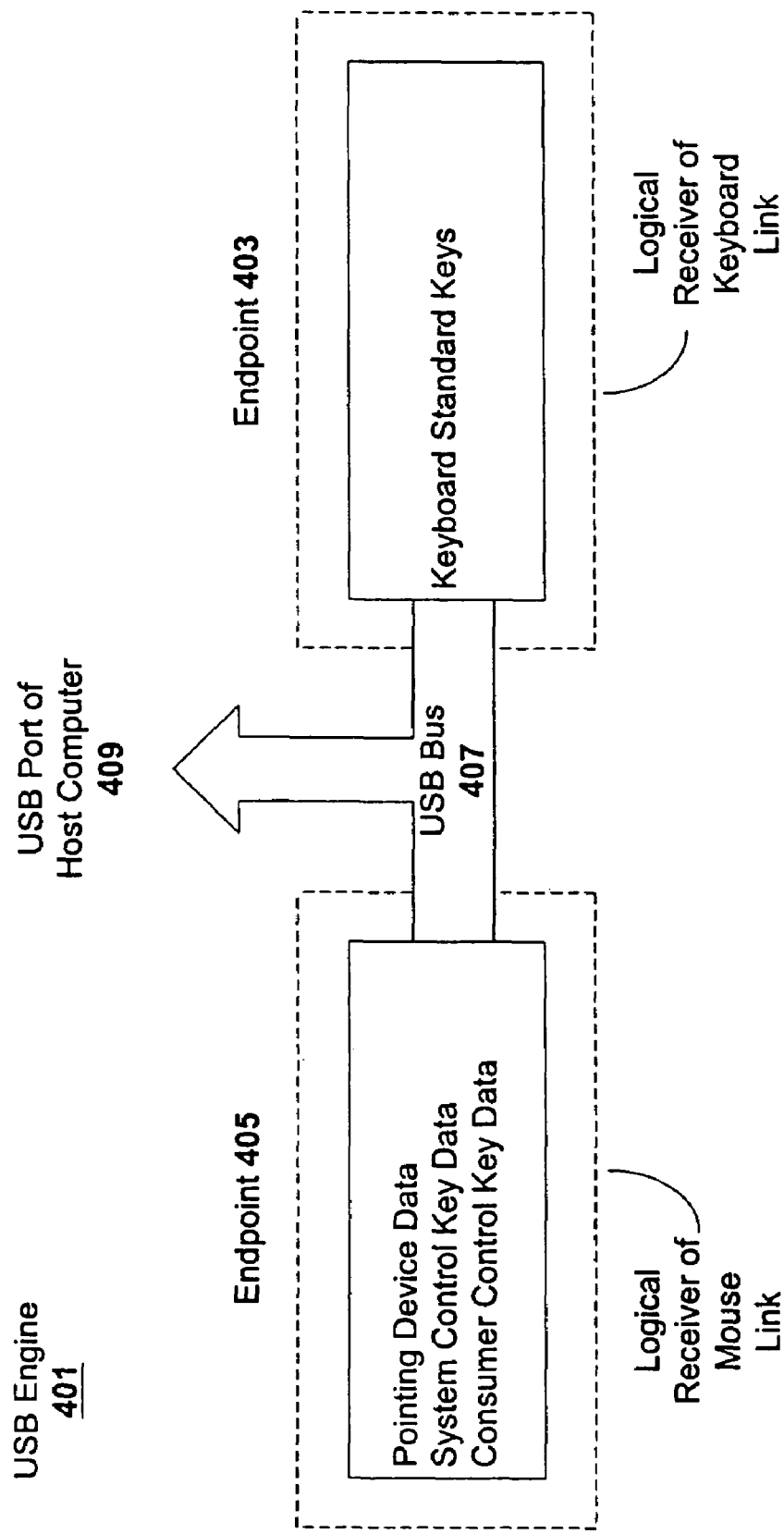
FIG. 4 is a block diagram illustrating a data report engine for processing multiple communication links in accordance with one embodiment of the present invention.

FIG. 4 is a block diagram illustrating a data report engine for processing multiple communication links in accordance with one embodiment of the present invention. The data report engine in this embodiment is a USB engine. However, those skilled in the art will recognize that other data report engines can also be used in light of this disclosure. Generally, the USB specification (including the Human Input Devices-HID class), which is incorporated by its entirety herein, defines a low-speed USB interface that provides two data pipes referred to as endpoint1 and endpoint2, and a control pipe referred to as endpoint0. Endpoint1 and endpoint2 are used to declare the functionality of various peripheral devices that transmit data to the host system. Endpoint0, on the other hand, is dedicated to configuring and controlling the receiver (e.g., cordless keyboard or mouse receiver).

In the embodiment shown in FIG. 4, USB engine 401 includes endpoint 403 and endpoint 405. These endpoints are used to send data reports to the host system in response to a system request for data ready to be transmitted. Each endpoint has a format that is defined by the HID class of the USB specification, and can include up to eight bytes of information (an endpoint containing more than eight bytes of information is possible, but its transmission can not be accomplished in a single pass). Each communication link of the receiver is mapped to a particular endpoint, although each endpoint can receive data from a number of communication links. In this sense, the actual receiver can be represented as a number of logical receivers.

Standard Data Report

Standard keyboard keys (e.g., Aa-Zz, 0-9, F1-F12, comma, period, semi-colon) are declared on the endpoint 403 data pipe of USB engine 401. In this embodiment, no other keys are declared on this endpoint 403 in order to provide, for example, maximum compatibility with existing systems at boot time. Various special function keyboard keys include system control keys (e.g., power keys such as on/off, sleep, wake-up), and consumer control keys (e.g., multimedia keys such as play, forward, rewind, stop, pause, volume up, volume down, mute; and Internet keys such as Internet home page, Internet search, Internet go or launch browser, e-mail). These keys are declared separately on the endpoint 405 data pipe (additional or different device keys could be associated with endpoint 405 as well). The data of a pointing device can also be sent over endpoint 405. For example, a stand alone mouse or trackball can be declared by endpoint 405, or a touch pad, trackball, and or wheel integrated in a keyboard can be declared by endpoint 405. Regardless of what type of devices are declared by the endpoints 403 and 405, such devices are known by the operating system of the host system. Additionally, the communication information from such devices is interpreted (e.g., decoded as explained above), for example, by an MCU. Thus, no active USB driver on the host system is required to interpret a data report resulting from communication information transmitted from the declared devices.

In the embodiment shown, device data associated with endpoint 405 is identified as system control key data and consumer control key data. A USB routine (e.g., a set of programming instructions running in an MCU included in the receiver) can properly identify the data and process that data accordingly. One of the bytes (e.g., the first byte) of endpoint 405 can be used to define what type of data is in endpoint 405. For example, if that first byte is equal to one, then device data associated with endpoint 405 might be pointing device data (e.g., mouse data or pointing device-type data from a keyboard (e.g., a wheel or trackball function embedded in a keyboard). On the other hand, if that first byte is equal to two, then device data associated with endpoint 405 might be system control key data (e.g., multimedia key data or Internet key data). Similarly, if that first byte is equal to three, then device data associated with endpoint 405 might be consumer control key data (e.g., power key data). The device data associated with endpoint 405 can be stored in any number of the other bytes included in endpoint 405.

Status Data Report

In addition to the standard keyboard key data and special function keyboard key data from a cordless device (e.g., keyboard and or mouse), additional data referred to as "status data" can also be included in the communication information transmitted from such cordless devices. Status data can include, for example, the sub-device type (e.g., a number describing the type of cordless device that is attached by an RF or microwave link), the battery status of the cordless device, a profile of the cordless device (e.g., shape, size, color, number of buttons, product name), a profile code of the cordless device, and the status of the cordless device (e.g., active and idle). Status data can also include the status of the receiver (e.g., the identity of the device requesting to be connected, a first-time power up condition of the device requesting to be connected, idle, a waiting for connection condition, or an "unmarried" condition (also referred to as an "out-of-box state") where the receiver has not yet identified a cordless device for which it provides data reports to a host system).

In general, status data is not standard, and is atypical of a cordless device transmission. As such, the operating system of the host will not recognize status data, nor will the host know what to do with the status data. Thus, unless a specific driver is installed on the host system, unexpected status data is either ignored or can confuse the host system possibly causing compatibility problems (e.g., the entire cordless device transmission is ignored). In an embodiment where status data is reported by a cordless device, therefore, a host-side driver (associated with the transmitting cordless device) can be installed to facilitate host processing and utilization of that status data. A flag can be raised to indicate that status data reporting is enabled, and or to indicate that status data is available to the host-side driver for a particular cordless device. In such an embodiment, compatibility issues are avoided even in the event that no specific driver is installed on the host system. For example, no status data report will be transmitted to the host system if status data reporting is not enabled (e.g., because no driver is installed on the host system as indicated by a flag). Thus, no compatibility issues will arise.

In general, a data report (e.g., standard data report or status data report) is a collection of different chunks of data, where the format of each data chunk is defined by the corresponding protocol of the data report engine (e.g., HID usage tables of the USB specifications). Each data chunk has a format that corresponds to the format of the data structure or endpoint from which the report was generated. The size of each data chunk can be defined as required (e.g., at the bit level or byte level). In one embodiment, a data report can include up to eight bytes of information, each byte defining a data chunk of the data report. One of the bytes included in the data report is declared as a set of eight "generic indicator" bits as specified in the USB specifications. To facilitate the extraction of the status data chunk from the data report, the size of the status reporting data chunk is a full byte, although not all eight bits are necessarily utilized. This byte is referred to as the status byte herein, as it is used to facilitate status data reporting. However, other embodiments could define different usages (other than as a "generic indicator") for these status reporting bits. Information included in "generic indicator" bits is generally ignored by the operating system of the host. Thus, there is minimal risk that any data included in the status byte will cause compatibility problems, or otherwise have an adverse effect on the communication. Note that although the status data in this embodiment is represented by a data chunk having a size of one byte, the data chunk size can be varied (e.g., five bits or two bytes) depending on, for example, the amount of information being reported and the ability of the receiver (e.g., MCU) to process the data chunk.

In one embodiment, a bit included in the status byte of a standard data report can be used to indicate that status data reporting is enabled (e.g., the corresponding driver is installed and running on the host system). In this embodiment, status data is reported by the receiver only when status reporting is enabled for a particular cordless device. This further ensures compatibility and a robust communication as the host system will not receive an unexpected status data report. In addition, other bits can be used to indicate that a status data report for a particular device is available for collection by a corresponding driver. For example, three bits can be used to identify which of eight cordless devices on a desktop is associated with the current standard data report. More or less bits can be used depending on, for example, how many devices are included in the cordless desktop. Alternatively, a randomly generated ID code can be used to uniquely identify each cordless device on the desktop, where in such an ID code is embedded in the data report. Additionally, another bit included in the status byte, for example, can be used to indicate that the particular device identified by the status byte has status data available for harvesting by the corresponding driver.

When the status data reporting mode is enabled and a status data report is available for a particular cordless device (e.g., as indicated by the status byte), the corresponding driver can then read the status data report. For example, the driver can issue a "Get Status" vendor command. The format of such vendor commands is vendor-specific, and therefore can be defined by the individual cordless device vendor. As earlier explained, a data report can allow the driver to identify the transmitting device. For example, suppose that a wireless mouse and a wireless trackball are both connected on the same communication link of a receiver. If the user decides to use the trackball after having used the mouse, the first trackball standard data report from the receiver will indicate to the driver running on the host system that the trackball is now the active device on the communication link, that status data reporting is enabled, and that status data of the trackball is ready to be collected. The driver can then read the status data report and change various parameters accordingly, such as cursor speed, acceleration, or buttons mapping. In the case of a new keyboard-type device being used, some keys might be remapped according to the new keyboard functionality.

In another example, suppose that a wireless mouse on a particular system has been upgraded to a new and improved model. When the user plugs in the new mouse, the first mouse communication coming from the receiver will indicate to a driver running on the host system that a new mouse is now the active device on the communication link, that status data reporting is enabled, and that status data of the new mouse is ready to be collected. The driver running on the host system can then read the status data report and launch a configuration routine that allows the user to reconfigure the driver to take advantage of the new mouse functionality. As part of the configuration process, a graphical image of the new mouse might appear on the user's screen. This image might include the new mouse features (e.g., a wheel and fourth button) because the status data report included, for example, a profile code accessible by the mouse driver. The driver can then perform a look-up in a profile code table, retrieve the new mouse image and integrate it into the configuration routine. If the profile code was not in the profile table, then a message could be presented to the user indicating that a new driver is available and instructions on how to get that new driver (e.g., via a download from a website on the Internet). Those skilled in the art will recognize many variations of these described scenarios in light of this disclosure.

Figure 5A:
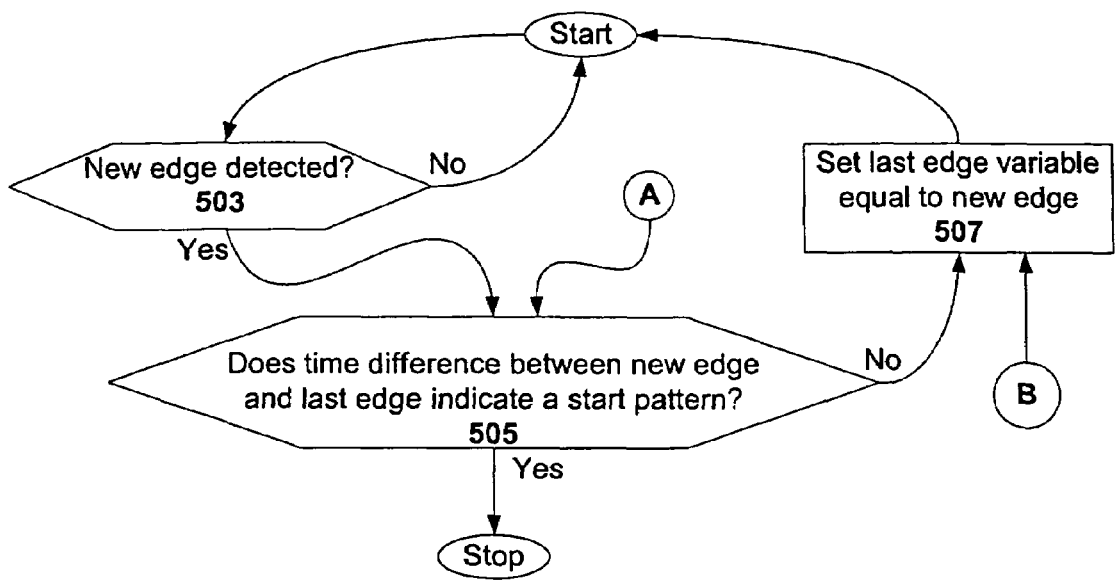
FIGS. 5a and 5b are flow charts illustrating a method for performing edge-level processing of a communication signal in accordance with one embodiment of the present invention.
Figure 5B:
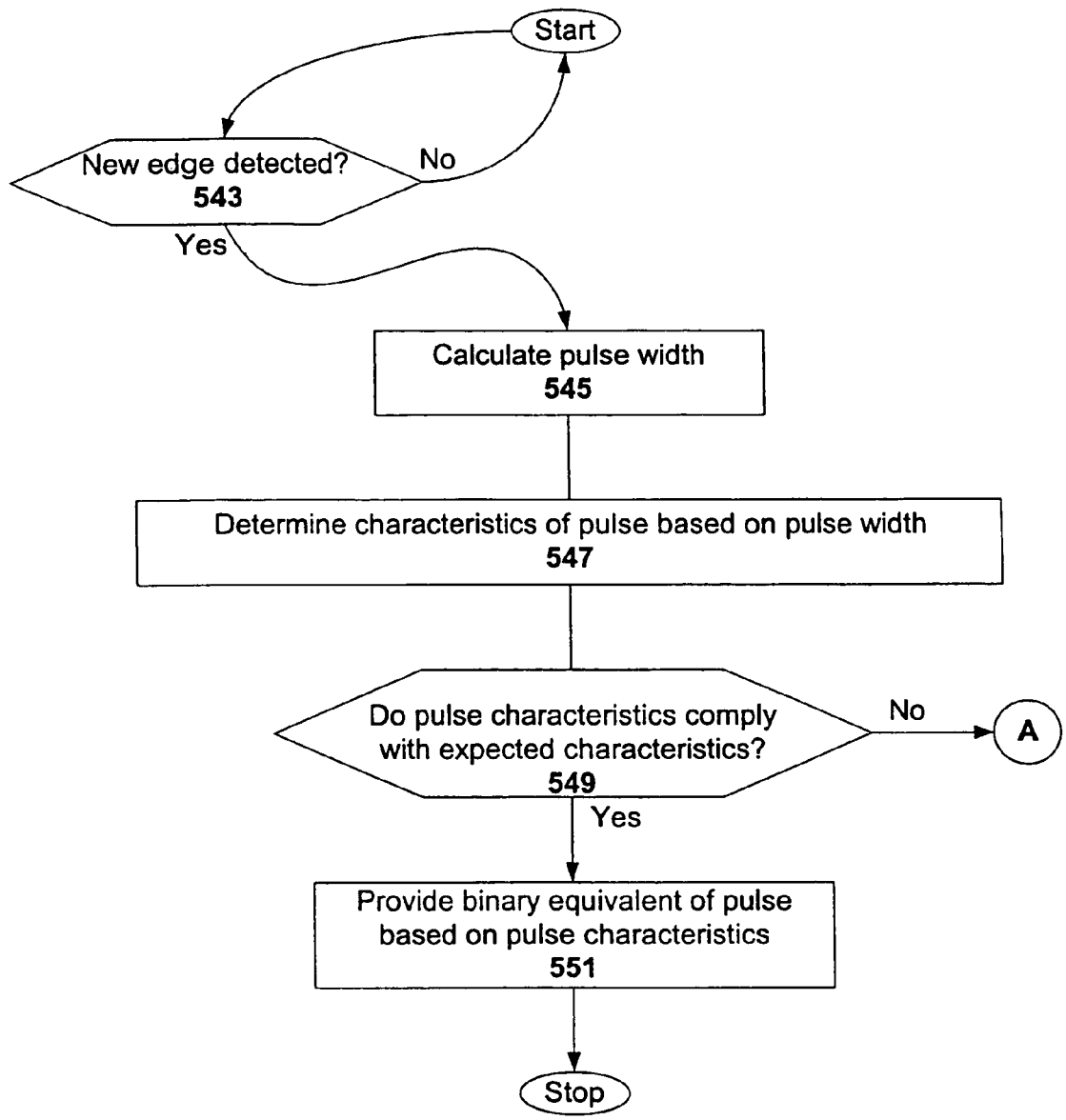

FIGS. 5a and 5b are flow charts illustrating a method for performing edge-level processing of a communication signal in accordance with one embodiment of the present invention. These methods can be performed, for example, by a set of programming instructions running in an MCU as discussed with reference to FIG. 3. The method of FIG. 5a begins with determining 503 whether a new edge has been detected. In one embodiment, a filtered and demodulated digital signal including a number of data packets is provided to an I/O of an MCU having edge detection capability. Any input capture mechanism that can detect a signal transition from one state to another (e.g., digital high state to a digital low state, and vice versa) can be used to detect the edges of the digital signal. If no signal edges are detected, the method includes waiting for an edge to be detected.

Once a new edge is detected, the method proceeds with determining 505 whether the time difference between the new edge and a last edge (e.g., previously detected and stored in a last edge variable) indicates an acceptable start pattern. A start pattern indicates, for example, the beginning of a data packet included in the digital signal. In one embodiment, a time associated with the new edge and a time associated with the last edge are stored in a memory (e.g., a RAM included in the MCU). These times can be retrieved so that the difference between them can be calculated thereby yielding a pulse width between the two edges. This pulse width can be compared to a predetermined range of values where any pulse width in that range indicates a start pattern. The predetermined range of acceptable start pattern pulse widths is a function of, for example, the encoding scheme used in generating the communication signal (e.g., the encoding scheme implemented in the transmitter of the cordless device).

For example, an encoding scheme (e.g., Miller delay encoding scheme) used to assemble the communication signal might be associated with a start pattern that is typically 1.0 to 1.5 milliseconds in width. Thus, if the time difference between the two edges indicates a pulse width that does not fall within the acceptable start pattern range, then a valid start pattern has not been received. In this case, the method further includes setting 507 the last edge variable equal to the new edge, and then waiting for a new edge so that determination 505 can be performed again. In this way, false start patterns can be ignored, and each edge encountered is given the opportunity to be a component of a valid start pattern. Those skilled in the art will recognize that determining whether a valid start pattern has been received can include detecting more than one pulse width (e.g., a positive start pattern pulse and a negative start pattern pulse).

On the other hand, if the time difference between the two edges indicates. a pulse width that does fall within the acceptable start pattern range, then a valid start pattern has been received. In this case, the method further may include calculating a compensation value. A compensation value can be used to adjust for deviations from the theoretical start pattern value. Such a theoretical start pattern value is a function of, for example, the encoding scheme used to generate the communication signal. A deviation from this theoretical start pattern can be caused, for instance, by asymmetrical characteristics introduced into the digital signal during the demodulation process (discussed with reference to FIG. 2). In one embodiment, the compensation value can be calculated by taking the absolute difference between the actual start pattern pulse width and the theoretical start pattern pulse width. This compensation value can also be stored in a memory.

The method of FIG. 5b can be implemented once a valid start pattern is detected as illustrated in FIG. 5a. The method begins with determining 543 whether a new edge has been detected. As with the method of FIG. 5a, any input capture mechanism that can detect a signal transition from one state to another can be used to detect the edges of the digital signal. If no signal edges are detected, the method includes waiting for an edge to be detected. Once a new edge is detected, the method includes calculating 545 the time difference between the new edge and the last edge (e.g. previously detected and stored in a last edge variable). This difference can be referred to as a pulse width, the pulse being defined by the two edges. In one embodiment, a time associated with the new edge and a time associated with the last edge are stored in a memory (e.g., a RAM included in the MCU). These times can be retrieved so that the difference between them can be calculated thereby yielding the pulse width. A compensation value, as explained above, can be used to adjust the resulting pulse width thereby compensating for deviations from the theoretical value of the pulse width.

The method continues with determining 547 various characteristics of the pulse based on the pulse width. In one embodiment, the number of periods included in the pulse is determined. For example, assuming a Miller encoding scheme was used to generate the communication signal, the number of Miller periods can be determined (e.g., number of Miller periods equals the pulse width divided by 208 microseconds, where the result is rounded to the nearest whole number). In such an embodiment, the number of periods included in the pulse can be used to further determine the meaning of the pulse.

Once the relevant characteristics of the pulse are determined, the method continues with determining 549 if those characteristics comply with expected characteristics. For example, it can be determined whether the number of periods (e.g., Miller periods) included in the pulse is equal to two, three, or four periods. Likewise, the value of the bits represented by the pulse (e.g., last bit is logical one or logical 0) can be determined. Such expected pulse characteristics are defined, for instance, by the encoding scheme used to generate the communication signal. If it is determined that the pulse characteristics do not comply with expected characteristics (e.g., number of periods equals less than two or greater than four), then an invalid pulse has been detected. In this case, the method can include proceeding to step 505 of FIG. 5a. This allows the pulse that failed to comply with expected characteristics to be further considered as a potential start pattern. Those skilled in the art will recognize that the value of certain variables (e.g., new edge and last edge variables) must be maintained to afford each edge an opportunity to be considered as a component of a valid pulse, whether a start pattern pulse or other-type pulse (e.g., a bit pattern pulse) in order to provide a robust communication system.

On the other hand, if it is determined that the pulse characteristics do comply with expected characteristics, then a valid pulse has been detected. In this case, the method can further includes providing 551 the binary equivalent of the pulse based on the pulse characteristics. For example, a pulse having two miller periods and a last bit equal to logical one might have a binary equivalent of "1". If the last bit is a logical zero, however, then the binary equivalent might be a "0". In addition, a pulse having three miller periods and a last bit equal to logical one might have a binary equivalent of "00". If the last bit is a logical zero, however, then the binary equivalent might be "01". Also, a pulse having four miller periods and a last bit equal to logical one might have a binary equivalent of "01". If the last bit is a logical zero, however, then a invalid pulse may have been detected.

Those skilled in the art understand that the above examples are for discussion purposes and for facilitating understanding of the invention, and are not intended to limit the present invention. For example, other encoding schemes can be used when generating a communication signal (e.g., Non-Return-to-Zero coding scheme in conjunction with bit stuffing techniques, or bi-phase coding schemes, or other coding schemes where logical ones and zeros are distinguished, for example, by polarity changes and pulse widths). In addition, other pulse characteristics and or binary equivalents can be used as well when performing edge processing of a communication signal in accordance with this disclosure. Variations on the methods shown in FIGS. 5a and 5b will be apparent in light of this disclosure depending on, for example, the encoding and decoding techniques used, processing power of the receiver MCU, and the number of possible meanings for detected pulses included in the communication signal.

Figure 6:
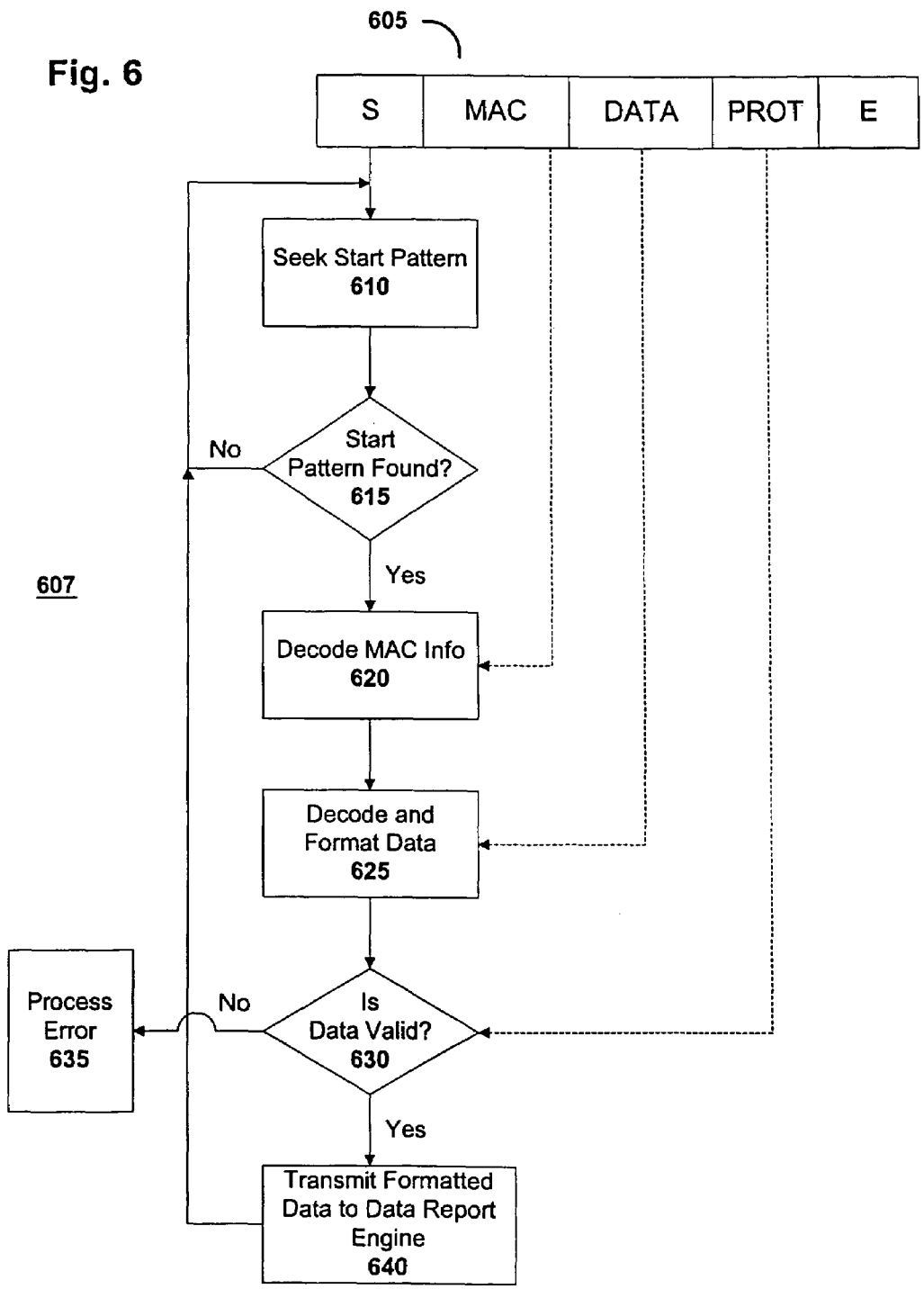
FIG. 6 is a flowchart illustrating a method for performing data-level processing of a communication signal in accordance with one embodiment of the present invention.

FIG. 6 is a flowchart illustrating a method for performing data-level processing of a communication signal in accordance with one embodiment of the present invention. Method 607 can be implemented, for example, with software, firmware, hardware or any combination thereof. In one embodiment, the method is implemented by a set of programming instructions running in an MCU included in a receiver such as the embodiment shown in FIG. 1 (other receiver embodiments apparent in light of this disclosure can also be used). Digital communication packet 605 can be received at an I/O of a processing environment (e.g., a CPU or an MCU). In the embodiment shown, the data packet consists of five fields. The S field can be used to indicate the beginning of the data packet. For example, the S field can contain a start pattern that can be used as a triggering identifier to start the data-decoding process.

The MAC field is used to provide the media access control information. Such information is specific to the type of physical medium over which the corresponding communication system operates, and defines the corresponding media access protocol. In one embodiment, the MAC field is comprised of a frame-type field, a data-type field and a short ID field. Each of these fields is discussed in detail in U.S. Pat. No. 5,881,366, which was previously incorporated. Generally, the frame-type field defines the transmission type (e.g., standard data transmission or status data transmission). The data-type field indicates the type of communication device that generated the transmission (e.g., 27 MHz keyboard or a 2.45 GHz game pad). The short ID field indicates the specific identity of the communication device that generated the transmission (e.g., a randomly generated, unique device ID).

The DATA field contains the data that is being transmitted from a cordless keyboard. For example, the DATA field might contain cursor position information from a wireless mouse or keystroke information from a cordless keyboard. The PROT field can be used to implement an error detection scheme such as cyclic redundancy check (CRC) so that any transmission errors can be corrected. Various error detection techniques can be implemented for most communication protocols. The E field can be used to indicate the end of the data packet (e.g., a stop pattern).

Digital communication packet 605 is provided as an example of a possible data packet structure. Those skilled in the art will appreciate a multitude of variations on this example in light of this disclosure. For example, other forms of header information such as the address of the target machine can be transmitted in the packet header. Additionally, there can be more than one data field. Moreover, the size of each field is dependent upon the individual communication systems and applications. Additionally, various combinations and orders of fields can be used. Thus, the present invention is intended to function with any form of packet data structure providing that packet includes the requisite information needed in processing that packet (e.g., a triggering identifier or start pattern). Method 607 will now be discussed in terms of packet 605.

Method 607 begins by seeking 610 a start pattern or triggering identifier. When a data packet is received, a determination 615 is made as to whether a start pattern or triggering identifier has been detected. In one embodiment, this is achieved by interrogating the S field of the packet. Alternatively, a flag or other suitable triggering identifier set during the bit-level processing can be used to indicate that data is ready to be interpreted and formatted. If no start pattern or triggering identifier is detected, then the process continues to loop and waits to receive an indication that data is available to interpret and format.

If a start pattern or triggering identifier is detected, the method continues with decoding 620 the MAC information. Such information can be extracted, for example, from a MAC field, or a series of fields (e.g., such as the frame-type, data-type and short ID fields). Regardless, the extracted information can define, for example, the corresponding MAC protocol, the transmission type, the transmitting device type, and the transmitting device ID. Such decoded information can then be made available to the process.

The method continues with decoding and formatting 625 the data included in the DATA field in accordance with the decoded MAC information. At this point, a determination 630 is made as to whether the data from the DATA field is valid. If not, then the method might include rejecting the data and processing 635 the error (e.g., ignore the data or request a resend of the data). If the data is determined to be valid, however, then the method proceeds with transmitting 640 the data to a data report engine (e.g., a USB engine). The data report engine can then generate a data report and transmit that report to the host system.

Those skilled in the art will appreciate that the process flow of method 607 is dependent, in part, on the data packet structure. Thus, variations in the data packet structure will result in variations on the steps of the method. These variations, such as the inclusion of address decoding, will be apparent to one of ordinary skill in light of this disclosure.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A microcontroller implemented method for processing a digital communication packet derived from a transmission received from a cordless device, the method comprising:
    detecting a first state transition included in the digital communication packet;
    assigning a first time to the first state transition;
    detecting a second state transition included in the digital communication packet;
    assigning a second time to the second state transition;
    determining a pulse width based on the first and second times; and
    responsive to the pulse width being within a predetermined range of values,
    decoding and formatting data included in the digital communication packet prior to transmitting the data to a host system.

2. The method of claim 1 wherein the pulse width being within the predetermined range of values indicates that a valid start pattern of the digital communication packet has been received.

3. The method of claim 1 wherein the pulse width being within the predetermined range of values indicates that a valid stop pattern of the digital communication packet has been received.

4. The method of claim 1 wherein the pulse width being within the predetermined range of values indicates that a valid bit pattern of the digital communication packet has been received.

5. The method of claim 1 further comprising:
    providing the decoded and formatted data to a data report engine for transmission to the host system having no active driver corresponding to the cordless device.

6. The method of claim 1, wherein digital communication packets from a number of different communication links, each communication link associated with a different cordless device, are processed simultaneously.

7. The method of claim 1 wherein the first time and the second time are assigned based on a timer.

8. The method of claim 1 further comprising:
determining one or more characteristics of the pulse based on the pulse width;
determining whether the one or more characteristics comply with expected characteristics; and
responsive to the one or more characteristics complying with the expected characteristics, determining the pulse is valid.

9. The method of claim 8 wherein expected characteristics are defined by an encoding scheme used to generate the digital communication packet.

10. A communication apparatus for processing a transmission received from a cordless device, the apparatus comprising:
a microcontroller unit having an input that receives a digital communication packet derived from the transmission, the microcontroller unit for processing the digital communication packet and further comprising:
an edge detection mechanism coupled to the input for detecting state transitions included in the digital communication packet;
a timer having a first value that is read in response to the edge detection mechanism detecting a first state transition, and a second value that is read in response to the edge detection mechanism detecting a second state transition; and
a central processing unit having access to the first and second values of the timer, the central processing unit for determining a pulse width based on the first and second values of the timer and responsive to the pulse width being within a predetermined range of values, decoding and formatting data included in the digital communication packet prior to transmitting the data to a host system.

11. The apparatus of claim 10 further comprising:
a data report engine operatively coupled to the central processing unit, the data report engine for receiving the decoded and formatted data from the central processing unit, generating a standard data report that can be transmitted to, and understood by, the host system having no active driver corresponding to the cordless device.

12. A computer program product, stored on a computer readable medium, for processing a digital communication packet derived from a transmission received from a cordless device, wherein in response to the computer program product being executed by a processor, the processor performs the steps of:
detecting a first state transition included in the digital communication packet;
assigning a first time to the first state transition;
detecting a second state transition included in the digital communication packet;
assigning a second time to the second state transition;
determining a pulse width based on the first and second times; and
responsive to the pulse width being within a predetermined range of values,
decoding and formatting data included in the digital communication packet prior to transmitting the data to a host system.

* * * * *